Patented July 14, 1936

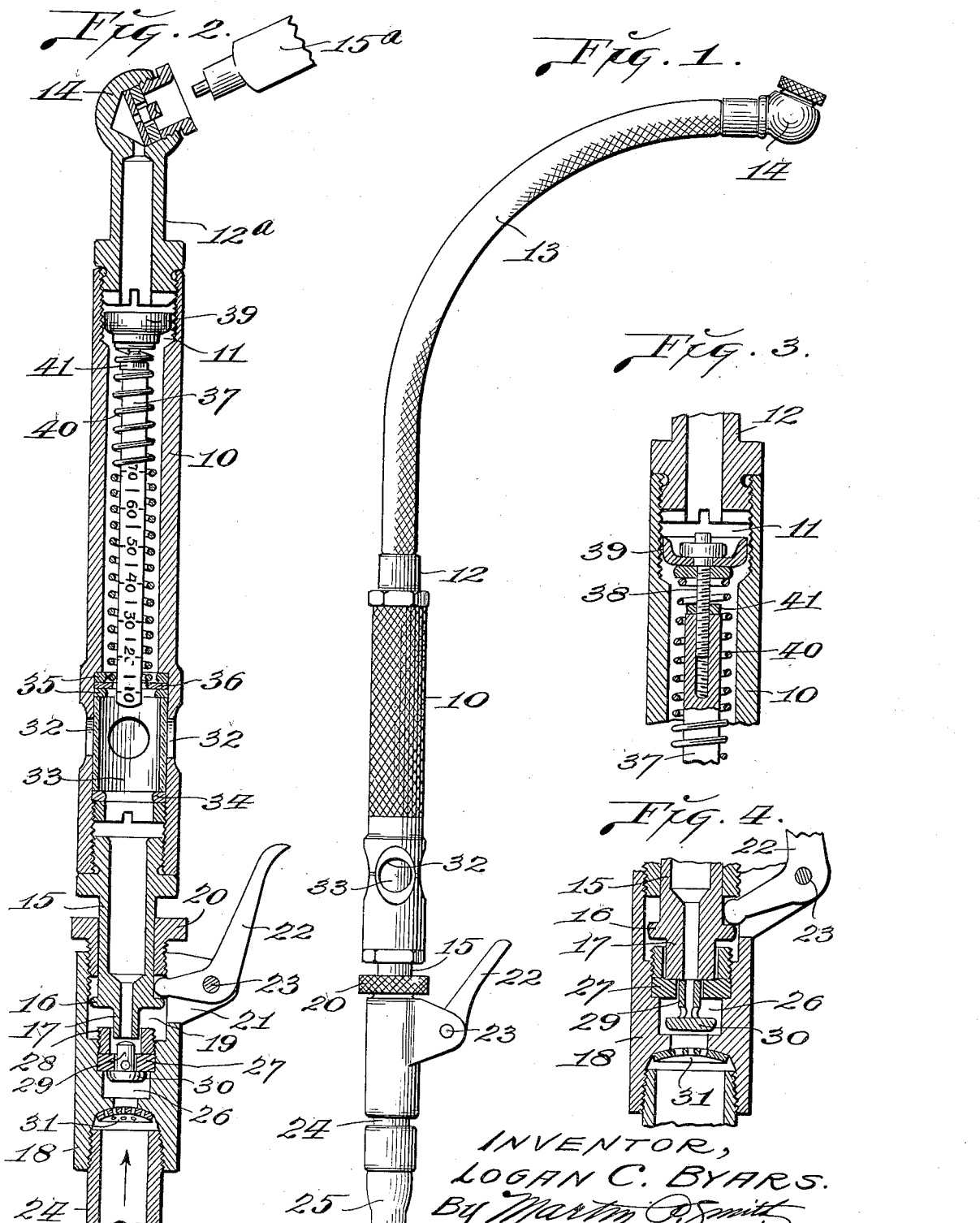

2,047,405

UNITED STATES PATENT OFFICE 2,047,405

COMBINED TIRE INFLATER AND PRESSURE GAUGE

Logan C. Byars, Los Angeles, Calif.

Application July 25, 1932, Serial No. 624,400

6 Claims. (Cl. 152—11.5)

My invention relates to a combined tire inflater and pressure gauge and has for its principal object, the provision of a relatively simple, practical and inexpensive device that may be conveniently manipulated for delivering compressed air to an inflatable member such as the inner tube of a pneumatic tire and for readily ascertaining during the inflating operation, the degree of air pressure that prevails within the inner tube or other inflatable member.

Further objects of my invention are, to generally improve upon and simplify the construction of the existing forms of combined tire inflater and pressure gauges, further, to provide a device of the character referred to wherein the main body of said device is swiveled so as to rotate freely in both directions and the construction of the swivel being such that it is not subject to air pressure and consequently requiring no packing, further, to provide a construction wherein the graduated gauge rod is wholly enclosed within the gauge body so that said gauge rod and parts directly associated therewith are at all times protected against contact with external objects and the surface of the gauge rod and the markings thereon being maintained in a clean condition due to the flow of air over the surfaces of said gauge rod while said air is being delivered to the casing or other member that is inflated.

A further object of my invention is, to provide a relatively simple, strong and durable combined inflater and gauge that may be used either as a combined inflater and gauge, or for performing the functions of a pressure gauge only.

With the foregoing and other objects in view my invention consists in certain novel features of construction and arrangements of parts that will be hereinafter more fully described and claimed and illustrated in the accompanying drawing in which:

Fig. 1 is an elevational view of a combined tire inflater and pressure gauge constructed in accordance with my invention and showing the valve stem engaging chuck carried by a short flexible tube that is connected to one end of the gauge body.

Fig. 2 is an enlarged section taken lengthwise through the center of the combined tire inflater and pressure gauge and showing the valve stem engaging chuck directly connected to one end of the swiveled gauge body.

Fig. 3 is an enlarged detail section through one end portion of the gauge body and showing in detail a piston that is adjustably mounted on the end of the gauge rod.

Fig. 4 is an enlarged detail section showing the valvular means that controls the admission of compressed air into the gauge body and with said valvular means in open position.

Referring by numerals to the accompanying drawing which illustrates a preferred embodiment of my invention, 10 designates a tubular body and the bore through this body is enlarged at one end as designated by 11, to form a chamber and the inner surface of the wall of this chamber is threaded.

Screw-seated in the outer portion of chamber 11 is one end of a nipple 12 and connected to said nipple is one end of a short section of flexible tubing 13, the opposite end of which carries a standard form of chuck 14 that is utilized in connection with inflating devices. This chuck is adapted to engage the end of an ordinary inflating valve stem 15a for the purpose of delivering compressed air into and through said stem and to the inner tube or to the inflatable member that carries said stem.

In Fig. 2 the chuck 14 is shown as being formed integral with the nipple 12a, which construction is found convenient where the device is utilized principally for gauging air pressures in tires or other inflatable members.

The end of body 10 opposite the end that is provided with the chamber 11 is internally threaded and receives the threaded end of a tubular member 15 and formed on the outer end of said member 15 is a circumferential flange 16 and a relatively small tubular extension 17.

A short cylindrical block 18 is provided in one end with a chamber 19 that receives the end of tubular member 15, its flange 16 and stem 17 and surrounding the body of tubular member 15 is a tubular nut 20 that is screw-seated in the outer end of chamber 19.

The fitting of the parts just described is such that the tubular member 15 slides freely lengthwise through nut 20 and also rotates freely therein.

Projecting laterally from block 18 are ears 21, between which is positioned one end of a bell-crank 22 and the short arm of the bell-crank projects into the annular space between flange 16 and the inner end of tubular nut 20.

Bell-crank 22 is pivotally mounted on a pin 23 that is seated in ears 21 and the long arm of said bell-crank functions as a lever to be engaged by the thumb or finger when said lever is actuated to move tubular member 15 and block 18 lengthwise toward each other.

Screw-seated in the end of block 18 opposite the end that is provided with the chamber 19, is a nipple 24 that is connected to the end of a flexible tube 25 and which latter leads to a tank, pump or other source of compressed air supply.

Formed in block 18 between the inner end of nipple 24 and chamber 19, is a chamber 26 and seated on a shoulder that is formed within said chamber, is a ring 27 of flexible or elastic material and which ring is retained in position by a ring nut 28 that is screwed into the end of chamber 26 from the inner end of chamber 19.

Under normal conditions the stem 17 projects a short distance into ring nut 28 and when block 18 and the gauge body 10 move toward each other to their limit of movement, the end of tubular member 17 seats on the inner portion of ring 27, as illustrated in Fig. 4, and produces a fluid pressure tight joint between said tubular stem and ring 27.

Arranged to slide freely through the opening in ring 27 is a tubular member 29 provided on one end with a solid head 30 that occupies chamber 26 and when block 18 and gauge body 10 are moved away from each other to their limits of movement as illustrated in Fig. 2, head 30 is forced against the adjacent face of ring 27 as illustrated in Fig. 2, thereby providing a fluid pressure tight joint between said head and ring.

It will be understood that air under pressure enters the combined inflater and gauge through tubular connection 25 and nipple 24.

A screen 31, provided with small openings, is located in block 18 between the inner end of nipple 24 and chamber 26.

Formed through the wall of gauge body 10, adjacent to the end that receives the nipple 15, are four openings 32 that are arranged substantially 90° apart and positioned within the body 10 and covering said openings, is a short tubular member 33 of transparent material, preferably glass. Thus the openings 32 constitute windows through which may be readily observed, the gauge rod that moves lengthwise through the tubular transparent member 33.

The joints between the ends of tubular member 33 and the wall of body 10, are provided with suitable fluid pressure tight packings 34 and 35 and associated with one of these packings, is a disc 36 provided with a centrally arranged opening.

Arranged for longitudinal movement through the gauge body 10, and through the opening in disc 36, is a gauge rod 37 that is square in cross section and the four faces of this gauge rod are provided with graduated squares including numbers that indicate different degrees of air pressure.

Screw-seated in the end of gauge rod 37 that is positioned adjacent to the chamber 11, is an axially disposed stem 38, on the outer end of which is arranged a piston that includes a flexible cup-washer 39 of leather, rubber or the like and which latter is adapted to pass through the chamber in the body 10.

Surrounding gauge rod 37 and interposed between washer 36 and the piston that is carried by stem 38, is an expansive spring 40 that yieldingly resists movement of the gauge rod through washer 36 and the tubular transparent member 33.

Stem 38 which carries the cup-washer 39, against which bears one end of the spring 40, is screw-seated in the end of the gauge rod 37 in order that said stem and cup-washer, which forms an abutment for one end of the spring may be screwed into or out of the gauge rod, thus compensating for any variation of tension in the spring 40. In the event that after continued use the spring shortens or decreases slightly in tension, the stem may be screwed into the gauge rod a short distance so as to take up or compensate for this shortening or decrease of tension in the spring.

Under normal conditions the expansion of spring 40 maintains gauge rod 37 in position with the piston disposed within chamber 11 as illustrated in Fig. 3 and when so positioned the free up-turned edge of the cup washer may expand and relax, thereby materially increasing its life or period of service.

A lock nut 41 is mounted on the threaded stem 38 for the purpose of locking the same after its adjustment in the end of the gauge rod.

Under normal conditions and with tube 25 connected to a source of compressed air supply, the pressure of the air within chamber 26, maintains the head 30 against the flexible ring 27 and consequently prevents air from discharging through the swiveled body 10 of the inflater and gauge.

In the use of the device as an inflater, the chuck 14 is applied to the end of the inflating valve 15, so as to push the valve stem inwardly and block 18 and the body 10 are now moved toward each other for a short distance by swinging bell-crank 22 upon its fulcrum and which action is accomplished by pressing the thumb or finger on the long arm of said bell-crank. As a result of the engagement of the end of the short arm of the bell-crank with the flange 16 on tubular extension 15, block 18 and body 10 are moved toward each other and as a result the end of stem 17 engages the end of stem 29 and forces the same through the packing ring 27 so that air under pressure is permitted to pass through the tubular stem 29 and this air passes directly through stem 17, tubular member 15, thence through body 10 past the upturned edge of the cup-washer 39 and through nipple 12 to the chuck 14 and from the latter, the air enters the filling stem or nipple 15 of the inner tube or other inflatable member.

As block 18 and body 10 are moved toward each other, the end of stem 17 is brought into contact with packing ring 27, as illustrated in Fig. 4, thus preventing the escape of compressed air into chamber 19 and out between the ears 21, and upon release of the bell-crank 22 the air pressure passing through block 18 will act to cause said block and body 10 to move away from each other and the air pressure upon head 30 will force the same onto packing ring 27, thereby cutting off the further flow of compressed air through the device.

In some instances the bell-crank 22 and the ears 21, to which said bell-crank is fulcrumed, may be omitted and where such construction is employed, the block 18 and tubular body 10 are manually engaged and moved toward each other so as to unseat valve comprising tubular member 29 and head 30 and thereby permitting air under pressure to pass through the device.

While the device is utilized as an inflater, the flow of air over the faces of the gauge rod 37 removes all dust and the like that would otherwise tend to settle on the gauge rod, with the result that said rod is always maintained in a clean condition and the graduated and numbered marks thereon are readily visible through the openings 32.

To ascertain the pressure of the air in the tube or other object that is being inflated, the operator permits block 18 to move away from body 10 so as to permit head 30 to rest on packing ring 27 and cut off the flow of compressed air through the device and with the chuck 14 holding the valve of filling nipple 15 open air from the tube or other object that is being inflated will pass from stem 15 through chuck 14 into tubular body 10 and this air pressure will force the piston, including the cup packing 39 which has its free edge forced outwardly against the inner face of the wall of member 10 by the pressure of the air on the top of the piston, through body 10 against the resistance offered by spring 40 and the gauge rod 37 will be moved through disc 36 and tubular transparent member 33 and when the gauge rod comes to a stop, the operator may readily observe the numbers appearing on the rod directly opposite the openings 32 and thus be advised as to the pressure of the air in the tube or other inflatable object.

In connection with the gauging or testing of pressure in a tire, it will be understood that the compressed air tanks of service stations generally maintain an air pressure of from one hundred pounds upwards so that tires that should be inflated to from forty to eighty or ninety pounds may be readily serviced with the inflater and pressure gauge that is connected to the air supply tank by line 25.

It will be understood that in testing the pressure of a tire with the device, the block 18 and body 10 are separated to their limit of movement and under such condition valve 30 rests on packing ring 27 to prevent the relatively high pressure from the tank from entering and passing through the device and that gauge rod 37 is actuated only by the lower degree of pressure prevailing in the tire to which the device is applied, for instance, in testing a tire that normally carries fifty pounds pressure when chuck 14 is applied to nipple 15 and the valve in said nipple is unseated, the air under pressure within the tire will pass through the chuck and strike against the flexible cup-washer 39, thereby expanding its free edges against the surrounding wall of tubular member 10 and thus the cup-washer functioning as a piston will be moved through member 10 against the resistance offered by spring 40 until an equilibrium is established and thus the operator will observe from the gauge rod the number thereof that is adjacent disc 36 and this shows the exact pressure within the tire that is being tested.

If the pressure in the tire is below normal, then the operator manipulates handle 22 so as to unseat valve 30, thereby admitting the relatively high pressure from the tank to flow through the device to move the gauge rod and cup leather 39 to their normal positions and the air under high pressure will enter the tube to inflate the same to the proper or desired degree.

Inasmuch as the body 10 is swiveled to the block 18, said body and the chuck carried thereby, may be readily rotated into convenient position to engage the valve stem of the tire or other inflatable object, thus enabling the device to be conveniently manipulated during inflating and pressure testing operations.

Inasmuch as the engagement of the stem 17 with the packing ring 27 during the time that compressed air is flowing through the device, the swivel connection between block 18 and tubular member 15 is not subjected to air pressure and consequently requires no packing and such swivel connection is free to function without restriction at all times.

Inasmuch as the gauge rod 37 is wholly enclosed within tubular body 10, it is protected against contact with extraneous objects and consequently it functions properly at all times and under all conditions.

Thus it will be seen that I have provided a combined tire inflater and pressure gauge that is relatively simple in construction, inexpensive of manufacture and very effective in performing the functions for which it is intended.

It will be understood that minor changes in the size, form and construction of the various parts of my improved combined tire inflater and pressure gauge may be made and substituted for those herein shown and described without departing from the spirit of the invention, the scope of which is set forth in the appended claims.

I claim as my invention:

1. A combined tire inflater and pressure gauge, comprising a tubular member, windows formed in the wall of said member adjacent to one end, a chuck carried by the opposite end of said member, the bore through said member adjacent to said chuck being slightly enlarged in diameter, a gauge rod arranged for longitudinal movement within the bore in said tubular member, a spring associated with said gauge rod for resisting its movement toward and past the windows in said tubular member, a cup leather washer carried by one end of said gauge rod and normally positioned in the enlarged end portion of the bore, a block mounted to slide and swivel upon the end of said tubular member opposite the chuck, means carried by said block and engaging a part of the tubular member for moving said block and member in opposite directions, there being a duct through said block and a valve arranged within said block and normally closing the duct therethrough, which valve is engaged by the end of the tubular member and unseated as said block and member are moved toward each other.

2. A combined tire inflater and pressure gauge, comprising a tubular member, a window formed in said member adjacent one end thereof, a chuck secured to the other end of said member, the bore within said tubular member adjacent the chuck being slightly increased in diameter with respect to said bore, a gauge rod arranged to move lengthwise through said member toward and past the window therein, a cup leather washer adjustably mounted on the end of said gauge rod and normally occupying a position within the enlarged portion of the bore in said tubular member, a block mounted to slide and swivel upon the end of the tubular member opposite the end that carries the chuck, said block being provided with a duct and valve seat and a valve normally positioned upon said seat and adapted to be engaged and unseated as the block and tubular member are moved toward each other.

3. A combined tire inflater and pressure gauge, comprising a tubular member, a window formed in said member adjacent one end thereof, a chuck secured to the other end of said member, the bore within said tubular member adjacent the chuck being slightly increased in diameter with respect to said bore, a gauge rod arranged to move lengthwise through said member toward and past the window therein, a cup leather washer adjustably mounted on the end of said gauge rod and normally occupying a position within the enlarged portion of the bore in said tubular member, a block mounted to slide and swivel upon the end of the tubular member opposite the end that carries the chuck, said block being provided with a duct and valve seat, a valve normally positioned upon said seat and adapted to be engaged and unseated as the block and tubular member are moved toward each other and a hand lever fulcrumed on said block and engaging said tubular member for moving said block and tubular member toward each other.

4. A combined tire inflater and pressure gauge, comprising a tubular member, a window formed in said member adjacent one end thereof, a chuck secured to the other end of said member, the bore within said tubular member adjacent the chuck being slightly increased in diameter with respect to said bore, a gauge rod arranged to move lengthwise through said member toward and past the window therein, a cup leather washer adjustably mounted on the end of said gauge rod and normally occupying a position within the enlarged portion of the bore in said tubular member, a block mounted to slide and swivel upon the end of the tubular member opposite the end that carries the chuck, said block being provided with a duct, a ring of flexible material arranged in said duct, a valve having a stem that projects through said ring, which valve normally rests against one face of said ring to cut off air flow through said duct, means carried by the block for moving the same and said tubular member toward each other and the end of which tubular member that extends into said block engages the projecting stem of the valve and unseats the same and engages the opposite face of said flexible ring when the block and tubular member are moved toward each other.

5. In a combined tire inflater and pressure gauge, a tubular member, a window formed in the wall of said tubular member, means carried by one end of said tubular member for connection to a source of fluid pressure supply, a chuck carried by the other end of said tubular member, a gauge rod mounted to move lengthwise through the bore of said tubular member toward and past said window, means associated with said gauge rod for yieldingly resisting its movement toward and past said window and a piston adjustably mounted on the end of the gauge rod that is normally positioned adjacent to the chuck carried by said tubular member.

6. In a combined tire inflater and pressure gauge, a tubular member, a window formed in the wall of said tubular member, a gauge rod arranged to move through the bore in said tubular member toward and past said window, a spring associated with said gauge rod for yieldingly resisting the movement of said gauge rod toward and past the window, a chuck carried by one end of said tubular member, that portion of the bore through the tubular member immediately adjacent to said chuck being slightly increased in diameter and a cup leather washer mounted for longitudinal adjustment upon the end of the gauge rod and normally occupying the enlarged end of the bore through said tubular member.

LOGAN C. BYARS.